United States Patent [19]

Snoddy et al.

[11] Patent Number: 4,569,020
[45] Date of Patent: Feb. 4, 1986

[54] IRRIGATION CONTROLLER

[75] Inventors: Max E. Snoddy; Charles S. Putnam, both of Dallas; Robert S. Gammenthaler, Plano; William P. Lutts, Richardson; Leo L. Brewster, Plano, all of Tex.

[73] Assignee: Telsco Industries, Inc., Dallas, Tex.

[21] Appl. No.: 498,252

[22] Filed: May 26, 1983

[51] Int. Cl.$^4$ .......................... G06F 15/46; G05D 7/06
[52] U.S. Cl. .................. 364/420; 137/624.2; 239/69; 364/145; 364/510
[58] Field of Search ............... 364/420, 510, 143–146, 364/483; 239/63, 66, 70, 71; 307/41, 141.4, 141; 137/624.11, 624.18, 624.2, 624.21, 624.27, 487.5, 551; 251/129; 340/663, 310 R, 310 A; 361/79, 86, 90, 92

[56] References Cited

U.S. PATENT DOCUMENTS

| 3,440,434 | 4/1969 | Yates et al. | 307/41 |
|---|---|---|---|
| 3,599,867 | 8/1971 | Griswold et al. | 239/70 X |
| 3,653,595 | 4/1972 | Greengard, Jr. et al. | 239/70 |
| 3,869,854 | 3/1975 | Church | 58/33 |
| 3,951,339 | 4/1976 | DuFresne | 239/66 |
| 3,991,939 | 11/1976 | Maclay | 239/63 |
| 4,121,114 | 10/1978 | Ruggles | 307/141 |
| 4,165,532 | 8/1979 | Kendall et al. | 364/420 |
| 4,176,395 | 11/1979 | Evelyn-Veere et al. | 364/420 |
| 4,189,776 | 2/1979 | Kendall | 364/420 |
| 4,190,884 | 2/1980 | Medina | 364/145 |
| 4,209,131 | 6/1980 | Barash et al. | 137/624.2 X |
| 4,244,022 | 1/1981 | Kendall | 364/420 |
| 4,265,403 | 5/1981 | Bonetti | 239/66 |
| 4,270,573 | 6/1981 | Sturman et al. | 137/624.2 |
| 4,423,484 | 12/1983 | Hamilton | 137/624.2 X |
| 4,428,020 | 1/1984 | Blanchard, Jr. | 361/92 X |

*Primary Examiner*—Joseph Ruggiero
*Attorney, Agent, or Firm*—Richards, Harris, Medlock & Andrews

[57] ABSTRACT

An automatic irrigation sprinkler controller (10) for controlling a plurality of sprinkler stations is provided. A processor (50) is provided for storing irrigation information and for generating control signals (96, 98) applied to the plurality of sprinkler stations. A function selector switch (18) is provided for allowing the operator to select a function and automatically input selected irrigation information associated with the selected function to the processor (50). Switches (20, 22) are provided for allowing the operator to select irrigation information for the function selected by the function selector switch (18).

5 Claims, 16 Drawing Figures

4,569,020

IRRIGATION CONTROLLER

TECHNICAL FIELD

This invention relates to controllers for irrigation systems, and more particularly to an irrigation system controller having a simplified data entry system.

BACKGROUND ART

Irrigation of large areas such as golf courses, parks and the like is a complicated matter. Typically, automatic equipment is utilized in which a plurality of sprinkler stations are strategically located throughout the area to be irrigated. Each sprinkler station contains a valve for controlling the flow of water entering the station from a source of pressurized water and exiting the station to a sprinkler line terminating in a plurality of sprinkler heads. The sprinkler heads are located at preselected locations so as to water the lawns, trees and shrubbery in a thorough and efficient manner. The various sprinkler stations are electrically connected back to a common controller. Since the water required by lawns, trees and shrubbery differs, it is usual to operate the sprinkler stations associated with lawn areas from one sprinkler station and those areas associated with shrubberies and trees from a separate and distinct sprinkler station. The controller to which the sprinkler stations are all ultimately connected is a clock operated device with the capability of keeping track of both the hours of the day and the day of the week. The clock mechanisms contained in such controllers operate switches which open and close the circuits to the various sprinkler stations so as to accomplish the irrigation of the area in an optimum manner.

Previously developed irrigation sprinkler system controllers have implemented their functions in a mechanical manner. Mechanical clock mechanisms drive one or more controller wheels having pins, cams and the like mounted thereon which operate the sprinkler station switches. The controller wheels of such devices are typically marked with the parameter being controlled such as the time of day or day of week. The activation pins, cams or the like are movable by the operator so as to "program" the controller to operate in the desired manner.

With only a few sprinkler stations to be controlled and under steady conditions, such mechanical controllers have provided a fairly workable system. However, as the number of stations to be controlled becomes large, the mechanical controllers have become excessive in size with compounding of mechanical failures. These mechanical failures are due to contact corrosion and limited duty cycles, as well as wear in the operation or changing of operating times or the like due to movement of mechanical parts. Such mechanical controllers may also present a problem to the operator for reprogramming or modifying an existing program.

Many of the disadvantages associated with mechanical irrigation controllers have been minimized through the use of automated programmable solid state controllers. Such irrigation controllers are described in U.S. Pat. No. 4,165,532 issued to Kendall, et al. on Aug. 21, 1979 and entitled "Automatic Irrigation Sprinkler System Controller" and U.S. Pat. No. 4,189,776 issued to Kendall on Feb. 19, 1979 and entitled "Simplified Irrigation Controller". Such controllers have provided increased reliability and simplification in the programming of the controller. Typically, input keyboards and the logic sequences incorporated therein are adapted to provide the operator with a wide selection of features. Start times, run times and programming calendars are directly input as alpha-numeric data through the keyboard which incorporates a plurality of numerically associated keys for the input of such data.

Such solid state logic controllers, however, do present problems to the average home owner when desiring to program his controller. The keyboard entry system for programming the controller in which dual functions may be associated with a single key of the keyboard and the associated entry sequence presents the home owner with a "computer" type looking irrigation controller which both physically and psychologically present a deterrent to its use.

A need has thus arisen for an irrigation controller which utilizes the state of the art microprocessor solid state logic and control circuitry to provide a reliable controller yet one which includes a simplified data entry system for operator use in programing and reprogramming the controller.

DISCLOSURE OF THE INVENTION

In accordance with the present invention, an irrigation controller having a simplified data entry system is provided for substantially eliminating the data entry problems heretofore associated with microprocessor controlled irrigation controllers.

In accordance with the present invention, an automatic irrigation sprinkler controller for controlling a plurality of sprinkler stations is provided. A processor is provided for storing irrigation information and for generating control signals applied to the plurality of sprinkler stations. A function selector switch is provided for allowing the operator to select a function and automatically input selected irrigation information associated with the selected function to the processor. Switches are provided for allowing the operator to select irrigation information for the function selected by the function selector switch.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

Figure 1:
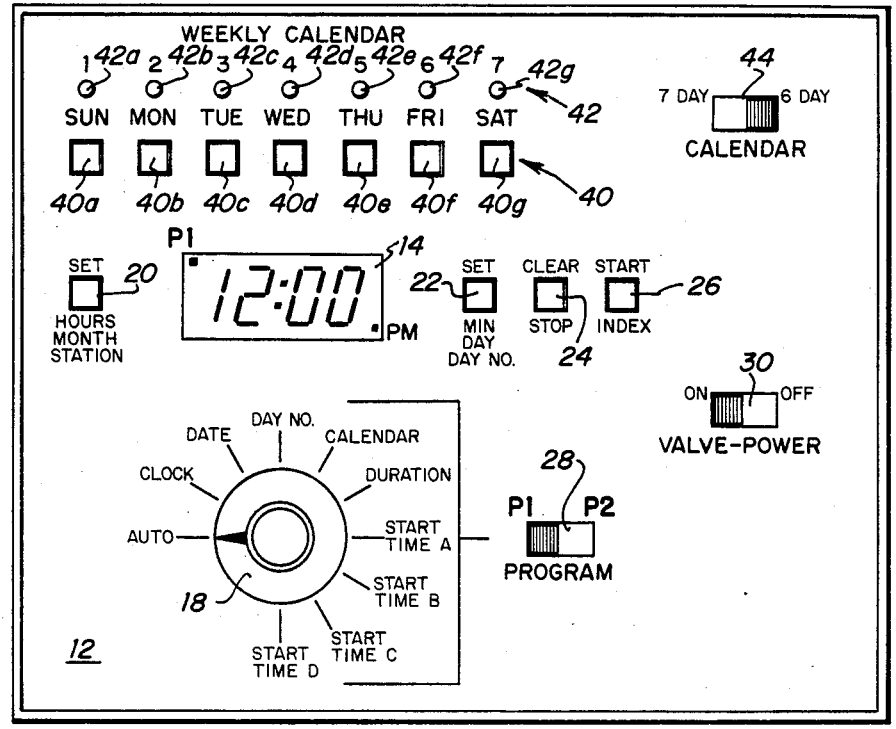
FIG. 1 is a drawing of the front panel of the controller of the present invention.

Referring to FIG. 1, the irrigation controller of the present invention is illustrated and is generally identified by the numeral 10. Irrigation controller 10 includes a front panel 12 which includes the various controls and indicators of controller 10. Panel 12 contains a display 14 for displaying the controller 10 initial parameters and irrigation information programmed by the operator. Display 14 displays the current time by displaying hours and minutes; the current date by displaying the month and day; the sprinkler station number; the watering duration for each station by displaying minutes; the start time for the watering sequence by displaying hours and minutes; the day number by displaying the numbers 1-7 corresponding to Sunday through Saturday; and whether the controller 10 is in the program 1 mode or program 2 mode of operation.

Positioned adjacent to display 14 is a function selector switch 18 having 10 positions which is utilized by the operator to select a combination of settings to develop a program for controller 10. Function selector switch 18 in combination with a switch 20 for selecting hours, months and station number irrigation information and a switch 22 for selecting minutes, day and day number irrigation information allows the operator to completely and automatically program controller 10 for controlling an irrigation system.

An important aspect of the present invention is the use of function selector switch 18 for automatically inputting irrigation information into controller 10 without the need for additional switches or keys as previously utilized in a keyboard entry system having multiple function keys and complicated entry routines. Function selector switch 18 selects the particular function including Auto, Clock, Date, Day Number, Calendar, Duration and Start Times A, B, C and D whereas switches 20 and 22 under operator control, allow the operator to select the specific irrigation information desired for the function selected by function selector switch 18. After the desired irrigation information has been selected utilizing switches 20 and 22, this irrigation information is automatically inputted into controller 10 by rotation of function selector switch 18 to the next desired function. It therefore can be seen that by utilizing switches 18, 20 and 22, nearly all programming of controller 10 can be accomplished by the operator. Specific programming steps for controller 10 will subsequently be described.

A switch 24 is provided on panel 12 which functions to clear or stop current programming entry into controller 10. A switch 26 is provided on panel 12 which functions when actuated to stop the current station from watering and advances to the next station in the program sequence. Switch 26 will also start a program. A switch 28 is provided on panel 12 for selecting one of two programs, P1 or P2 utilized with controller 10. A switch 30 is further provided for controller 10 which controls power to the watering stations.

An array of switches 40, including switches 40a-40g, allow the operator of controller 10 to select specific days of the week for watering. Associated with each switch 40a-40g is a display 42a-42g for indicating to the operator the selected watering day. Also provided on panel 12 of controller 10 is a switch 44 used in programming water days for selecting either a 6 or 7 day watering cycle as will subsequently be described. Switches 20, 22, 24, 26 and 40 may comprise, for example, push button switches, and switches 28, 30 and 44 may comprise, for example, slide switches.

Controller 10 functions in four modes of operation which include power-up/back-up operation; automatic operation; semi-automatic operation and manual operation. In the power-up/back-up operation, when power is first applied to controller 10, controller 10 is preprogrammed for watering times and duration. This mode of operation also performs as a back-up watering system in the event of a power failure. The present controller 10 utilizes a battery backup system designed to maintain the backup program for approximately 60 minutes. In the automatic mode of operation, the operator, through the use of switches 18, 20 and 22, selects various watering programs including water times, days designated for watering and duration per sprinkler station. In the semi-automatic operating mode, the operator can start a preprogram cycle if additional watering is desired. The manual mode of operation allows the operator to select a single sprinkler station for watering.

In the power-up/back-up mode of operation, when controller 10 is first connected to a power source, or when power is restored after controller 10 has been without power for a long period of time, displays 14 and 42 will be flashing or blinking and controller 10 will be preprogrammed. No watering station will be actuated. With switch 28 in the P1 position, function selector switch 18, when rotated through its ten positions, will cause displays 14 and 42 to indicate the preprogrammed or backup program as follows:

| Switch 18 position | Indication on display 14 |
|---|---|
| Auto | 12:00 (flashing) |
| Clock | 12:00 (flashing) |
| Date | 1.1 (January 1) (flashing) |
| Day No. | 1 (Sunday) (flashing) |
| Calendar | Display 42 flashing |
| Duration | .1:10 (flashing) |
| Start Time A | .1:10 (flashing) |
| Start Time B | .OFF (flashing) |
| Start Time C | .OFF (flashing) |
| Start Time D | .OFF (flashing) |

All watering station duration times will be 10 minutes when switch 28 is positioned in the P1 program position and off when switch 28 is positioned in the P2 program position. Display 14 indicates that the P1 program is being used by illuminating a dot in the upper left hand corner of display 14. Display 14 will stop flashing when function selector switch 18 has been rotated through all positions. It therefore can be seen that upon initial power-up of controller 10, controller 10 is programmed to a known state. The power-up program will initiate a watering cycle one hour after controller 10 is turned on unless the operator takes other programming measures.

As will subsequently be described, controller 10 includes a battery back-up system designed to maintain program and clock timing in the event of a power failure; however, watering stations will not operate until power is restored, and any station which is on at the time of power loss will be turned off. Once power is restored to controller 10, controller 10 will activate the next scheduled station. Display 14 will flash when power has been restored to controller 10 or when a faulty valve has been detected.

To place controller 10 in the automatic programming mode after the power-up/back-up operation mode is completed, function selector switch 18 is set to the Auto position. The next step is to set the current time which is accomplished by placing function selector switch 18 in the Clock position. A dot in display 14 at the lower right hand corner indicates p.m. Display 14 will initially read 12 o'clock p.m. on initial turn-on. In order to program the current hour, the operator actuates by, for example, depressing switch 20 until the desired hour is shown in the left hand portion of display 14. To program the current minutes, switch 22 is depressed by the operator until display 14 reads the current minutes. The programmed current time accomplished by utilizing switches 20 and 22 is then automatically input into controller 10 by rotating switch 18 from the Clock position to the Date position. No additional action by the operator is made in order to enter the current time. When switch 18 is in the Date position, the current date in the form of month and day can then be selected by the operator.

To select the current date, switch 18 is placed in the Date position. Display 14 will initially read the date of January 1 (1.1). To program the current month, the operator will depress switch 20. The left hand side on display 14 will display the numerals 1–12 corresponding to each of the twelve months. In order to program the current day of the month, the operator will depress switch 22 which will read 1–31 on the right hand side on display 14 corresponding to days 1–31 of the month selected. Once the current date in the form of month and day is programmed by the operator utilizing switches 20 and 22, function selector switch 18 is rotated from the Date position to the Day Number position, and in so doing, the current date and month is automatically input into controller 10.

To select the current day, switch 18 is positioned in the Day Number position which will cause display 14 to indicate a 1 in the right hand side of display 14 on turn-on. The operator then presses switch 22 to select the desired day number. The day number corresponds with the day of the week, Sunday through Saturday, and display 14 will indicate the number 1 through 7 on the right hand side of display 14. By rotation of function selector switch 18 from the Day Number position to the Calendar position, the programmed day number is automatically input into controller 10.

The next function to be selected is the Calendar function which is selected by rotation of function selector switch 18 from the Day Number position to the Calendar position. In this function position, the operator programs the specific days of the week or watering cycle, odd or even, desired. Switch 44 is positioned to either the 7 Day position or the 6 Day position.

In the 7 Day position, controller 10 allows the operator to select specific days of the week for the watering program, for example, Monday, Wednesday and Friday. In this mode of operation, controller 10 will actuate sprinkler stations on the same days every week. In the 6 Day calendar mode, the operator may select an even day, an odd day or an every third day watering cycle. In this mode, the watering program will begin with the first day set and will continue the frequency schedule selected rather than the specific days of the week. In the 6 Day calendar mode, determined by switch 44, switch 40g is inoperative. Switches 40a–40f are utilized in the 6 Day calendar watering cycle. For example, to program an odd day watering cycle if the current day were Wednesday and an odd date, switches 40b, 40d and 40f would be actuated thereby illuminating displays 42b, 42d and 42f. If the current day were a Thursday, and an odd date, switches 40a, 40c, 40e and 40g would be actuated thereby illuminating displays 42a, 42c, 42e and 42g. The switch 40g is actuated when switch 42a is actuated which is the first day of the next six day period. To program an even day watering cycle, and assuming the current date is Thursday and an even date day, switches 40a, 40c, 40e and 40g would be actuated. To program a third day water cycle where the current day is a Sunday and an odd date, switches 40a, 40d and 40g would be actuated.

With the switch 28 in the P1 position, and switch 44 selected for either the 7 Day or 6 Day calender mode, the operator selects the desired watering days by actuating switches 40. The Day selected will be indicated by the illumination of the corresponding display 42. By rotation of function selector switch 18 from the Calendar position to the Duration position, the selected watering days will be automatically input into controller 10.

To set the duration of the watering cycle at each station, function selector switch 18 is rotated to the Duration position. Display 14 will display the station number on the left hand portion and the duration in minutes on the right hand portion. The operator programs the station utilizing switch 20. Station numbers will move from one through the last numbered station in display 14. The operator next actuates switch 22 to set the duration time for the particular station selected. The duration time increases from "off" to 99 minutes displayed in the right hand portion of display 14. By incrementing the station number through actuation of switch 20, the operator can then program the duration time for each of the stations utilizing switch 22. Upon rotation of function selector switch 18 from the Duration position to the Start Time A position, all duration times for all stations are automatically input into controller 10. If a station is unused, the duration is set to off by selecting the station number and actuating switch 24.

The next step in programming controller 10 is the selection of the start times for the watering cycle of the irrigation system. By rotation of function selector switch 18 from the Duration position to the Start Time A position, display 14 will initially display one o'clock p.m. The operator then actuates switch 20 to program the desired start time hour which is displayed in the left hand portion of display 14. The operator then programs the desired start time minute by actuating switch 22. Display 14 then displays the desired minutes in the right hand portion of display 14. The selected start time for Start Time A is then automatically input into controller 10 by rotation of function selector switch 18 from the Start Time A position to the Start Time B position. Start times for times B, C and D are programmed in the same way as above described with respect to start time A. Any unused start times are set to off by utilizing switch 24. Controller 10 has the capability of actuating the irrigation system four times each day indicated by start times A, B, C and D for program P1.

Controller 10 is provided with a secondary independent program for the irrigation system. By placing switch 28 in the P2 program position, a second program can be developed for the irrigation system. With switch 28 in the P2 position, function selector switch 18 is positioned to the Calendar position. The selected watering days are then programmed by actuating switches 40 and the corresponding display 42 will be illuminated. The six day or seven day calendar program selected for program P1 must also be selected for program P2. Upon rotation of function selector switch 18 from the Calendar position to the Duration position, the selected watering days will automatically be input into controller 10 for the P2 program. With switch 18 in the Duration position, the operator can program the duration for each sprinkler station for program P2 as previously described with respect to program P1. Similarly, with switch 18 in the Start Time A, B, C or D positions, four start times may be selected for the irrigation system utilizing program P2. It therefore can be seen that by utilizing both programs P1 and P2, a total of eight different start times for the irrigation system may be achieved utilizing the present controller 10.

The semi-automatic mode of operation of controller 10 may be started when no program is in operation. Function selector switch 18 is positioned in the Auto position. Display 14 will indicate the current time. Switch 28 is then positioned in either the P1 or P2 position. Switch 26 is then actuated until the desired station number for beginning the semi-automatic operation appears on display 14. Controller 10 will then proceed through the remaining stations based upon the durations previously programmed.

In the manual mode of operation of controller 10, for selecting a single station for watering, station duration may be selected by either program P1 or program P2. Function selector switch 18 is positioned in the duration position. Display 14 will then display the station number and watering duration time. The selected watering station will be selected by operation of switch 20 until the desired station number appears in the left hand portion of display 14. Switch 26 is then actuated. Display 14 indicates the station selected and the water duration time. Switch 18 is then returned to the Auto position such that display 14 will display the indicated station selected and the water duration time remaining. When the manual water cycle is completed, controller 10 will shut the irrigation system off until the next scheduled start time. If the operator wishes to stop manual operation, switch 26 is actuated.

Figure 2:
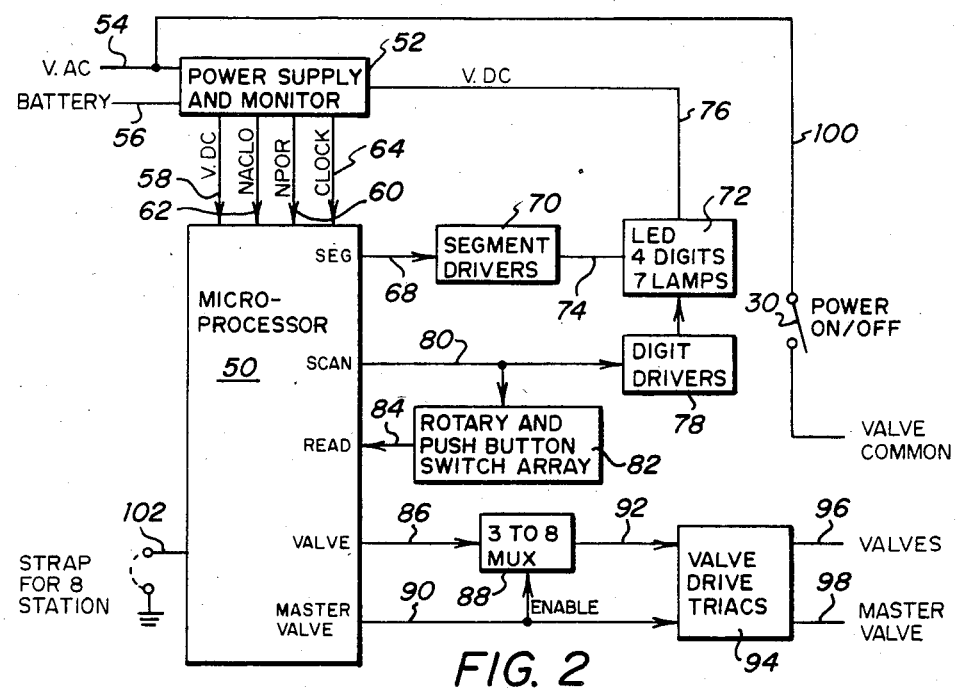
FIG. 2 is an electrical block diagram of the irrigation controller of the present invention.

Referring now to FIG. 2, a block diagram of the present controller 10 is illustrated. Irrigation controller 10 includes a microprocessor 50. Microprocessor 50 may comprise, for example, an 8049H single chip computer which contains 2048 bytes of program memory ROM and 128 bytes of RAM, a timer/counter, input/output ports and a central processing unit.

Power is supplied to microprocessor 50 from a power supply and monitor 52 which is interconnected to a power source via signal line 54 and a battery back-up power source via signal line 56. Power supply and monitor 52 generates four primary signals. Regulated DC power is supplied to microprocessor 50 from power supply and monitor 52 which utilizes a voltage regulator and associated circuitry. The regulated DC power signal is supplied to microprocessor 50 via signal line 58 which may comprise for example, 5 volts. Should the AC input voltage supplied via signal line 54 to power supply and monitor 52 fail, the voltage regulator within power supply and monitor 52 will automatically switch to the battery backup and continue to provide power to microprocessor 50.

A power on reset signal (NPOR) is generated by power supply and monitor 52 and is applied to microprocessor 50 via signal line 60 when AC power is first applied to irrigation controller 10. The power on reset signal ensures proper start-up of microprocessor 50 and stops the operation of controller 10 should the back-up battery voltage fall too low.

An important aspect of the present invention is the ability of controller 10 to monitor the watering station valves to determine a shorted valve. The present invention detects such a shorted valve and allows controller 10 to skip that watering station and continue with the next station in the program. A shorted valve will cause an excess of current to be drawn from the valve transformer, which in turn reduces the secondary voltage of the transformer. The reduced AC input voltage causes the signal NACLO to be generated by power supply and monitor 52 via signal line 62 applied to microprocessor 50. The duty cycle of the NACLO signal changes as a function of the AC input voltage, such that the NACLO signal is high for a large part of the cycle for higher input voltages and high for a lesser percentage of the cycle for lower input voltages. This duty cycle is measured by microprocessor 50 as will subsequently be described with respect to FIG. 3 (e). Measurement of the duty cycle of the NACLO signal allows irrigation controller 10 to detect the low input voltage resulting from a partially shorted valve and immediately turn that valve off and proceed to the next watering station. Power supply and monitor 52 has sufficient capacity to provide power to microprocessor 50, even if the valve is completely shorted, for sufficient time to allow detection of the short and to turn the station off.

The fourth signal generated by power supply monitor 52 is to provide a CLOCK signal via signal line 64 to microprocessor 50. The CLOCK signal is derived from the AC input and has a frequency of either 50 or 60 Hertz. The CLOCK input signal is utilized by microprocessor 50 for all clock functions and ensures accurate time keeping. Power supply and monitor 52 also includes a crystal oscillator for providing the CLOCK signal in the event of a power failure.

An output of microprocessor 50 is applied via signal line 68 to segment drivers 70. Segment drivers 70 are required to convert the segment outputs from microprocessor 50 to the current levels required by the LED segments and lamps 72 which are applied via signal line 74. LED segments and lamps 72 comprise displays 14 and 42 (FIG. 1) and receive a DC voltage as a power source from power supply and monitor 52 via signal line 76. Display 14 is a four digit clock LED type display and each of the displays 42a–42g are LED lamps. These displays are multiplexed by digit, therefore four digit drivers are required to drive the display 14 and one digit driver for the display 42. The digit drivers are indicated by block 78. The appropriate data for each segment/lamp is presented on signal lines 74 as each digit is driven. The digit scan is efficiently fast such that the human eye integrates the light input even though only one digit/lamp is on at a time.

Digit driver 78 converts the microprocessor 50 scan output via signal line 80 into the high current levels required to multiplex LED display 14 and display 42.

The scan output via signal line 80 is also applied to a rotary and push button switch array 82 which includes function selector switch 18, switches 20, 22, 24, 26, 28, 40 and 44 (FIG. 1). These switches may be arranged for example, in a matrix in which four such switches are read at a time as determined by the scan outputs of microprocessor 50 and the selected switches are read by microprocessor 50 via signal line 84.

The valve output port of microprocessor 50 is applied by signal line 86 to a multiplexer 88. Multiplexer 88 converts the selected valve outputs encoded into three bits to a discrete output for each valve. The enable input of multiplexer 88 is driven by microprocessor 50 from the master valve output port via signal line 90. This enable signal prevents any valve outputs from being driven if the master valve output is not also driven. The output of multiplexer 88 applied via signal line 92 and the output of microprocessor 50 applied via signal line 90 is applied to triacs 94 which switch the input voltage to the station valves via signal lines 96 and 98.

Switch 30 (FIG. 1) interrupts power to the valve common terminal but does not control power to power supply and monitor 52 since switch 30 is independently connected to the input power source via signal line 100. Thus, all time keeping is maintained if switch 30 is turned off. Controller 10 can only be completely powered down by removing the input power source and battery back-up source from power supply and monitor 52.

Controller 10 is designed for operating a plurality of sprinkler stations such as, for example, six or eight stations. A strap 102 is provided for microprocessor 50 for determining the system configuration. For example, if a six station controller is desired, strap 102 is removed. This condition is read by microprocessor 50 which limits the number of stations to six and the valve drive triacs 94 and associated components may be removed.

Referring now to FIG. 3, a software flow diagram for the logic contained within microprocessor 50 of the present controller is shown. The logic of FIG. 3 can best be understood with reference to FIG. 1 and the control panel 12 of controller 10. Referring more specifically to FIGS. 3(a), (b) and (c), the Dial routine is illustrated and the logic sequence begins at "Start" in FIG. 3(a). The system parameters are first initialized. A determination is made as to whether a watering station is active, since it is not desired to begin programming of controller 10 while a station is in the manual mode of operation. If the station is running, a determination is made as to the remaining duration of watering time for the station, and if the time has expired, the station is turned off. If no active station were determined, a check is made as to whether the real time corresponds with an automatic start time for the irrigation system. Automatic start times are checked each time through the Dial routine. The automatic start routine is checked using the Auto cycle routine of FIG. 3(f), page connector A-1. The Auto cycle start routine returns to the Dial routine at page connector 1-2.

Whether or not there is a watering station to be started, the logic next determines whether the switch 24 (FIG. 1) is active. As previously mentioned, switch 24 functions to terminate a currently active watering station or to set a duration or start time to off. Because switch 24 has these two functions, it is necessary to insure that a station is not running if switch 24 is to be used for the secondary function. Therefore, the current watering station is turned off and logic flags and the calendar are updated through the routine shown in the logic flow diagram of FIG. 3(g), page connector M-1. Page connector 1-3 is a return from the routine shown in FIGS. 3(g) and 3(h).

Figure 3A:
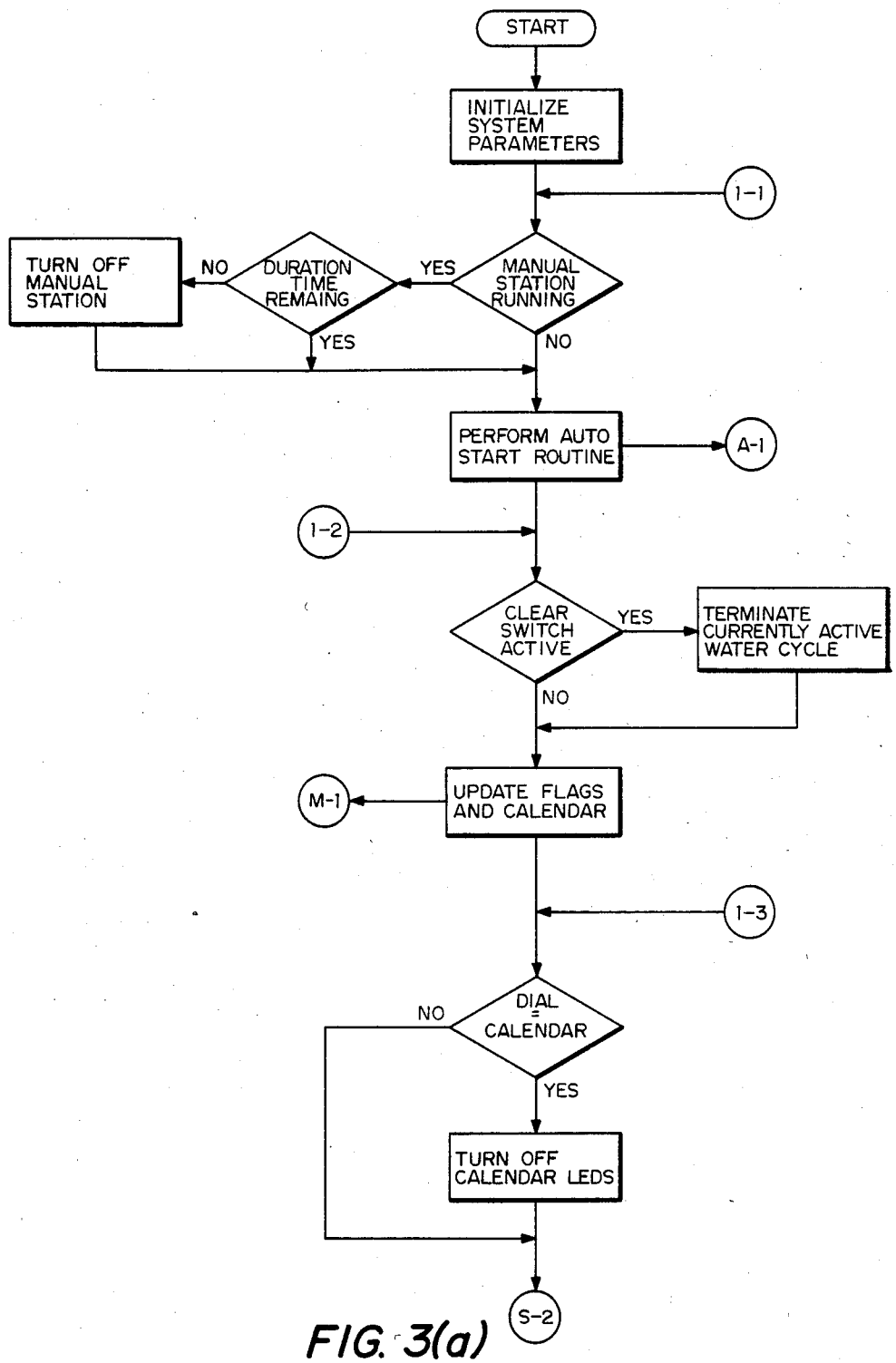
FIGS. 3(a)–3(n) are software flow diagrams of the logic contained in the microprocessor of the present invention for accomplishing the functions of the present irrigation controller.

Continuing in the Dial routine of FIG. 3(a), a determination is made as to whether function selector switch 18 is in the calendar position. If function selector switch 18 is in the calendar position, display 42 will be turned off. If function selector switch 18 is in any position other than the calendar position, the calendar flag is turned off and a determination is made as to the state of the blink flags (FIG. 3(b)). If the controller 10 has had a power failure or a shorted valve of a watering station, display 42 is caused to flash on and off. In order to clear the blinking condition, function selector switch 18 is rotated to the auto position and one bit for each dial position is turned off. When all the bits for the blink flag have been turned off, display 42 will no longer blink on and off. Continuing in the Dial routine of FIG. 3(b), a position of function selector switch 18 is then read. If switch 18 is in the Auto position, the Auto cycle routine of FIG. 3(f) will be executed. If switch 18 is in the Clock position the Clock routine of FIG. 3(i) will be executed. If switch 18 is in the Date position the Date routine of FIG. 3(j) will be executed. If switch 18 is in the Day Number position the Day of week routine of FIG. 3(k) will be executed. Continuing, if switch 18 is in the Calendar position, the Calendar routine of FIG. 3(l) will be executed.

Figure 3B:
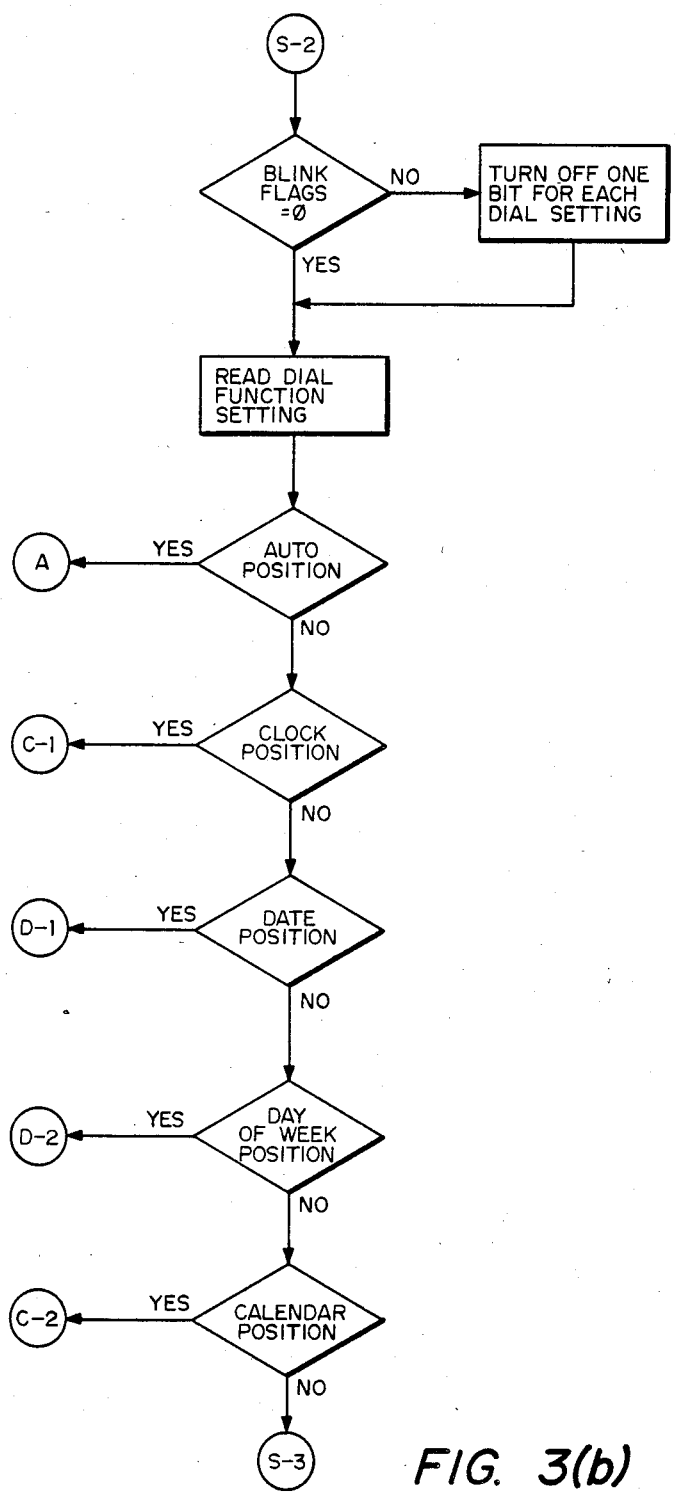
Figure 3C:
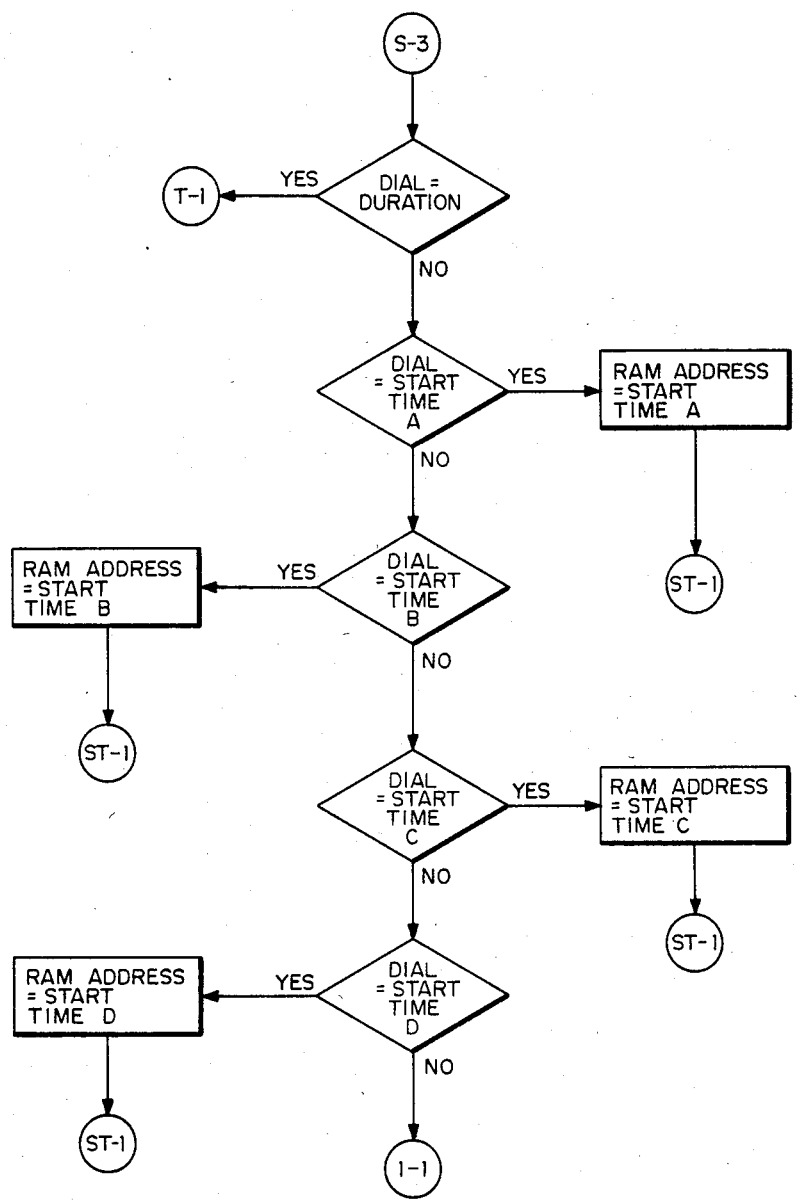
Figure 3D:
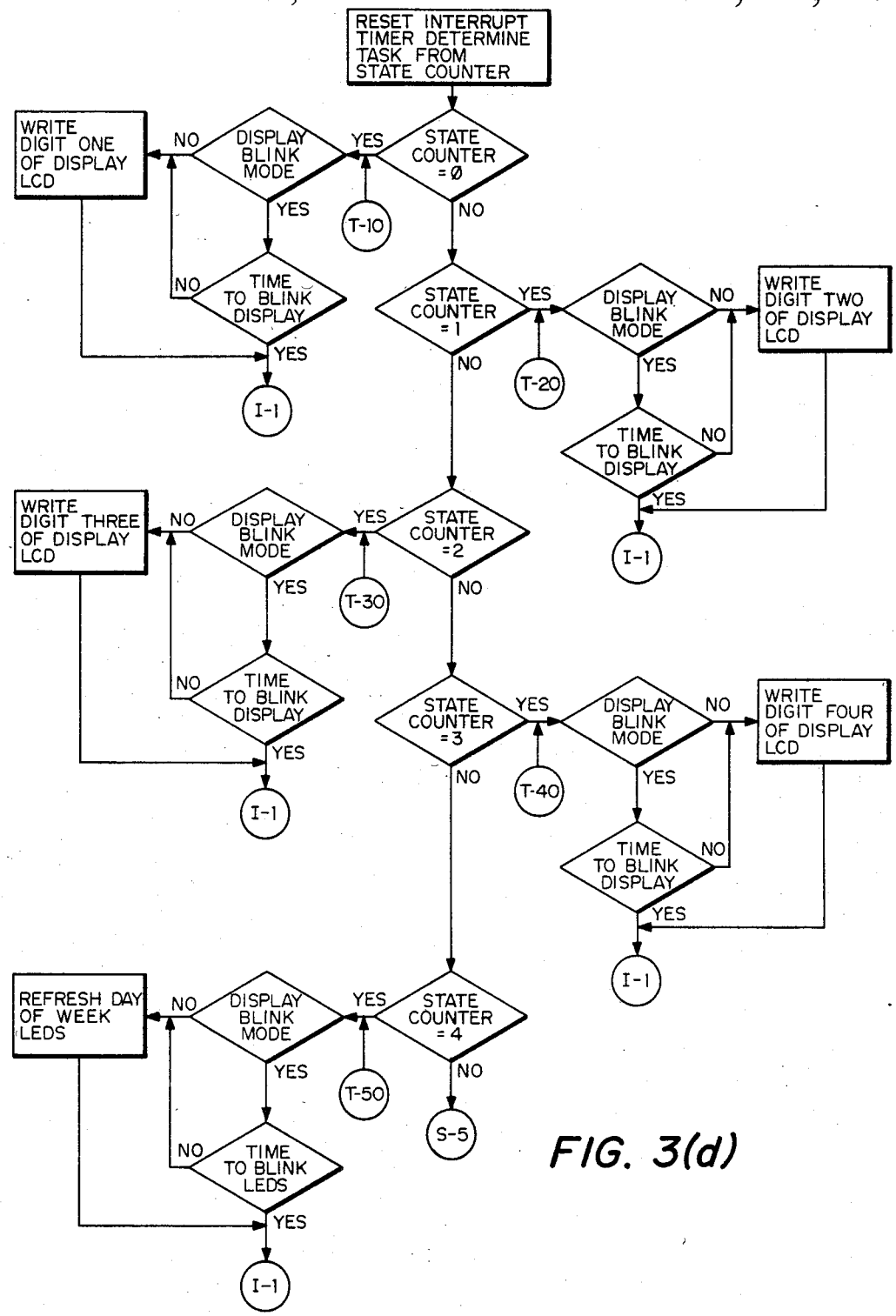
Figure 3E:
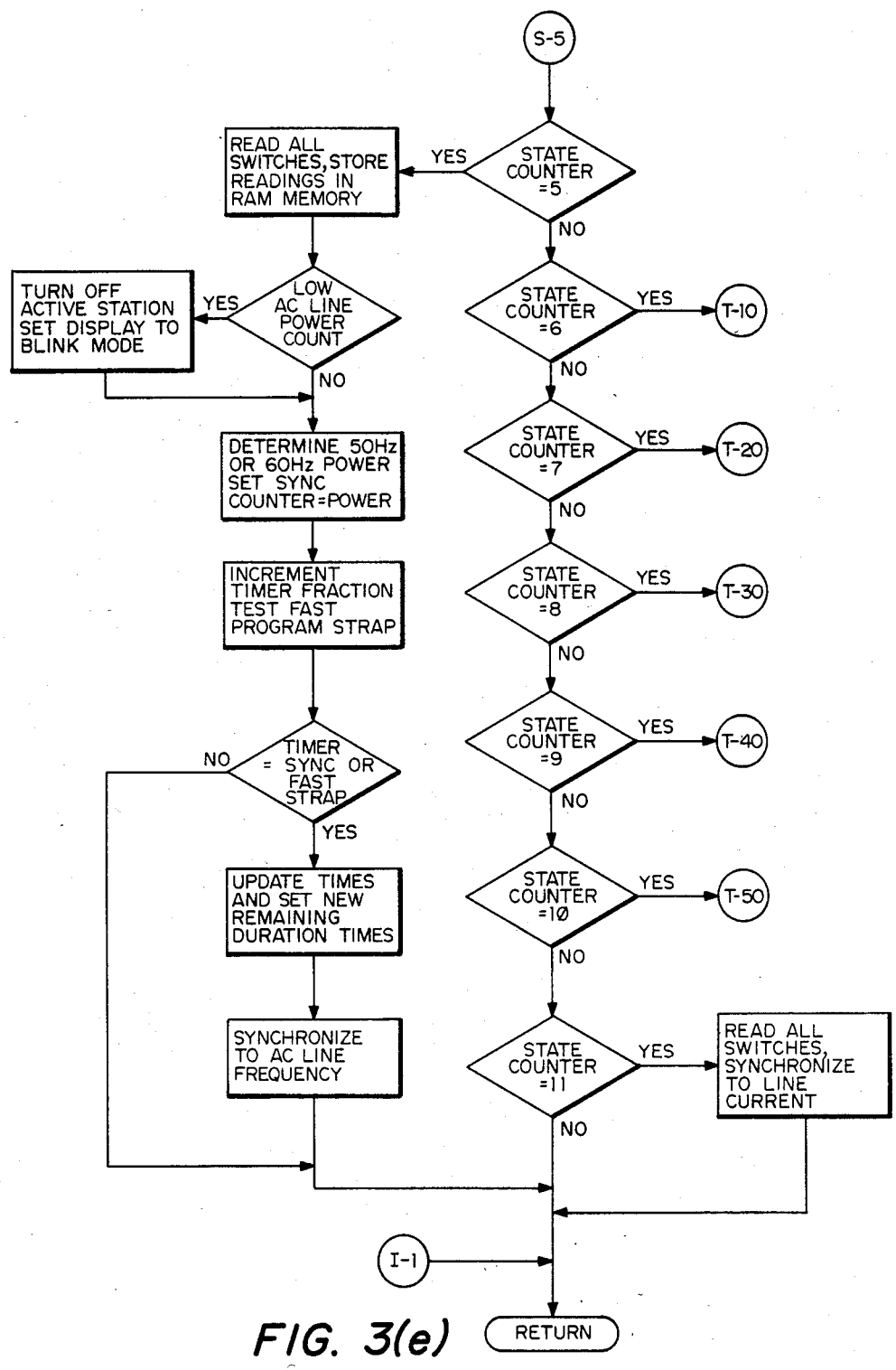
Figure 3F:
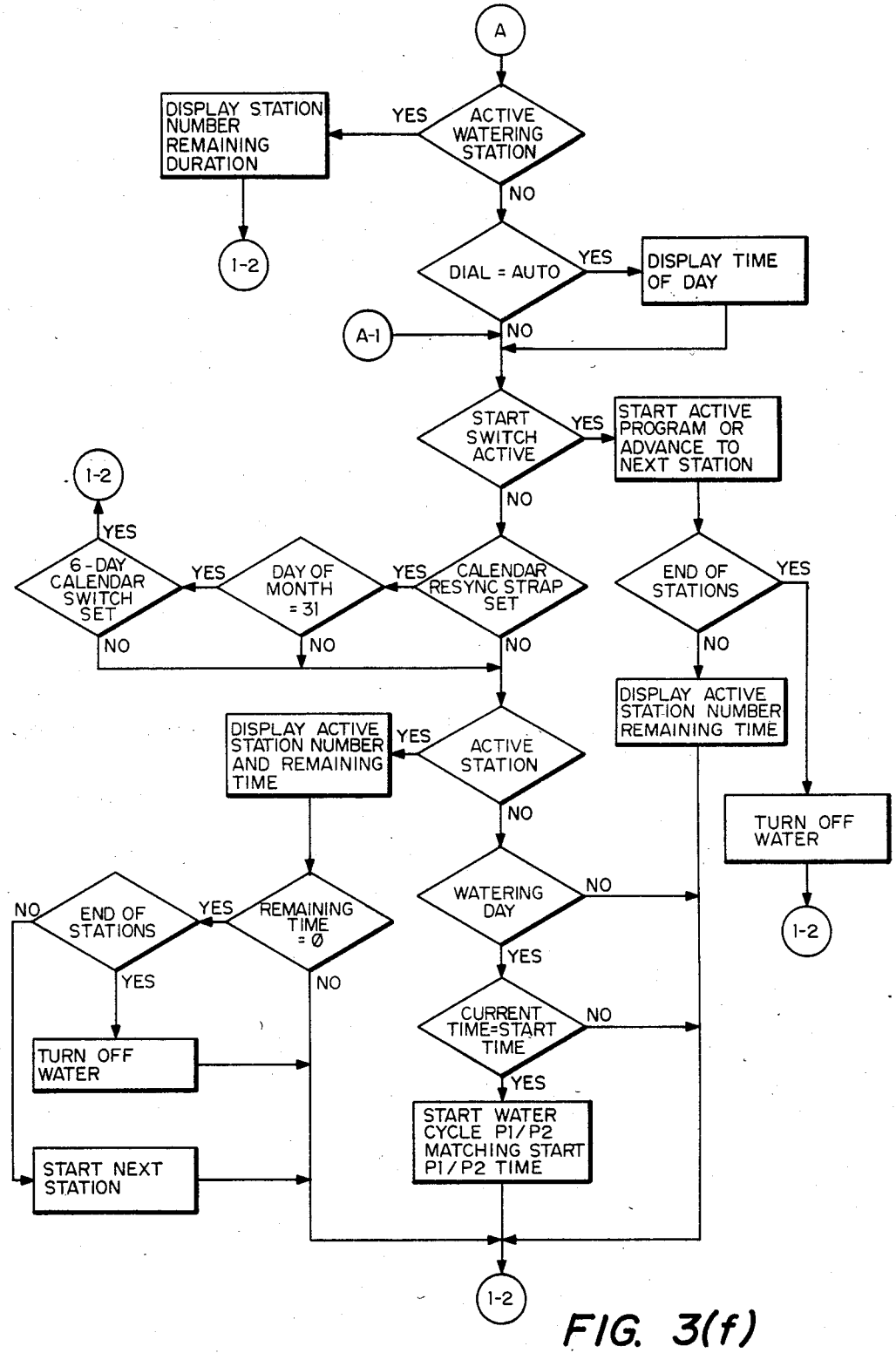
Figure 3G:
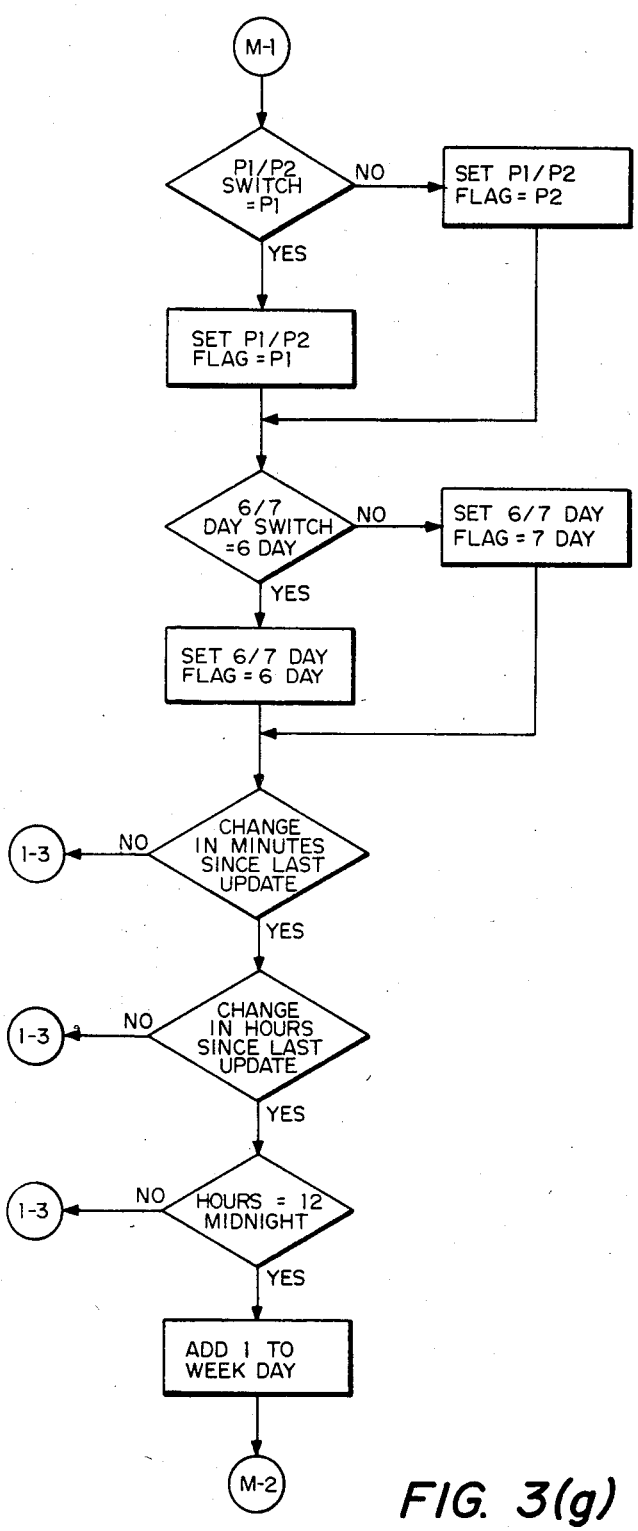
Figure 3H:
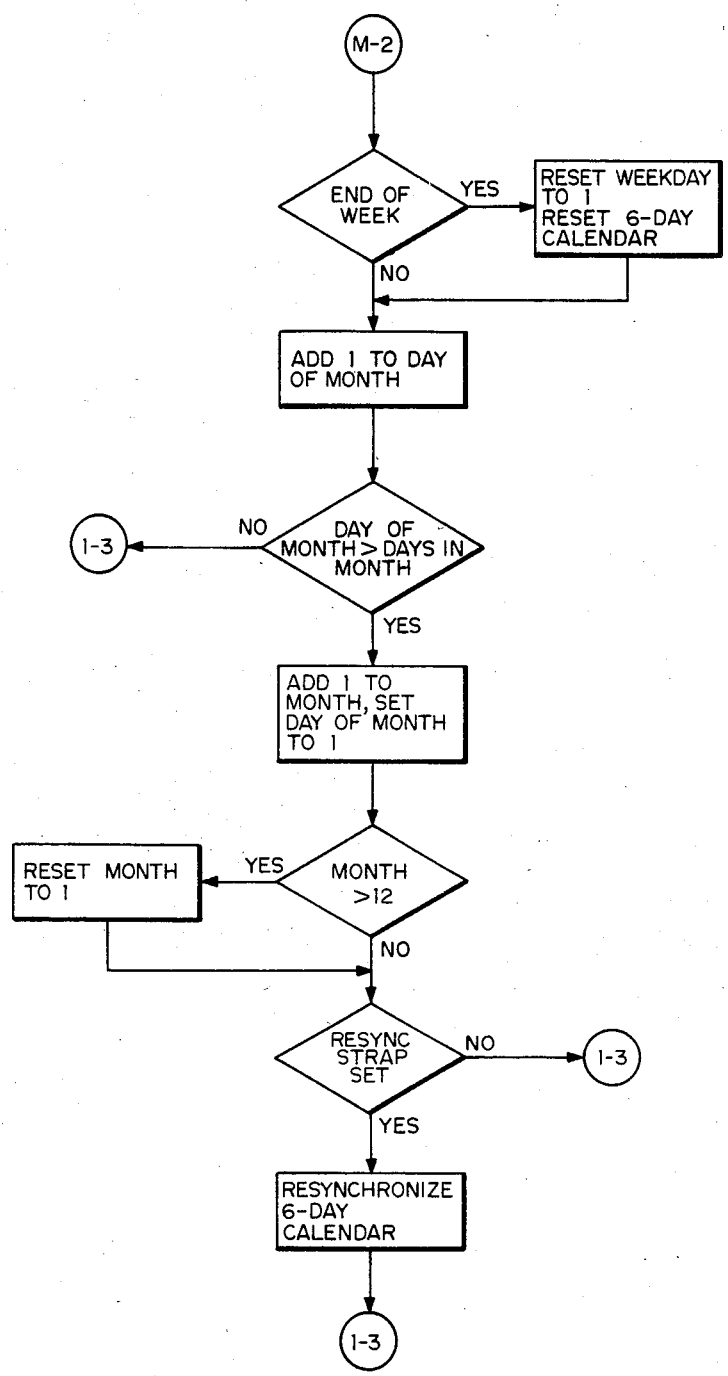
Figure 3I:
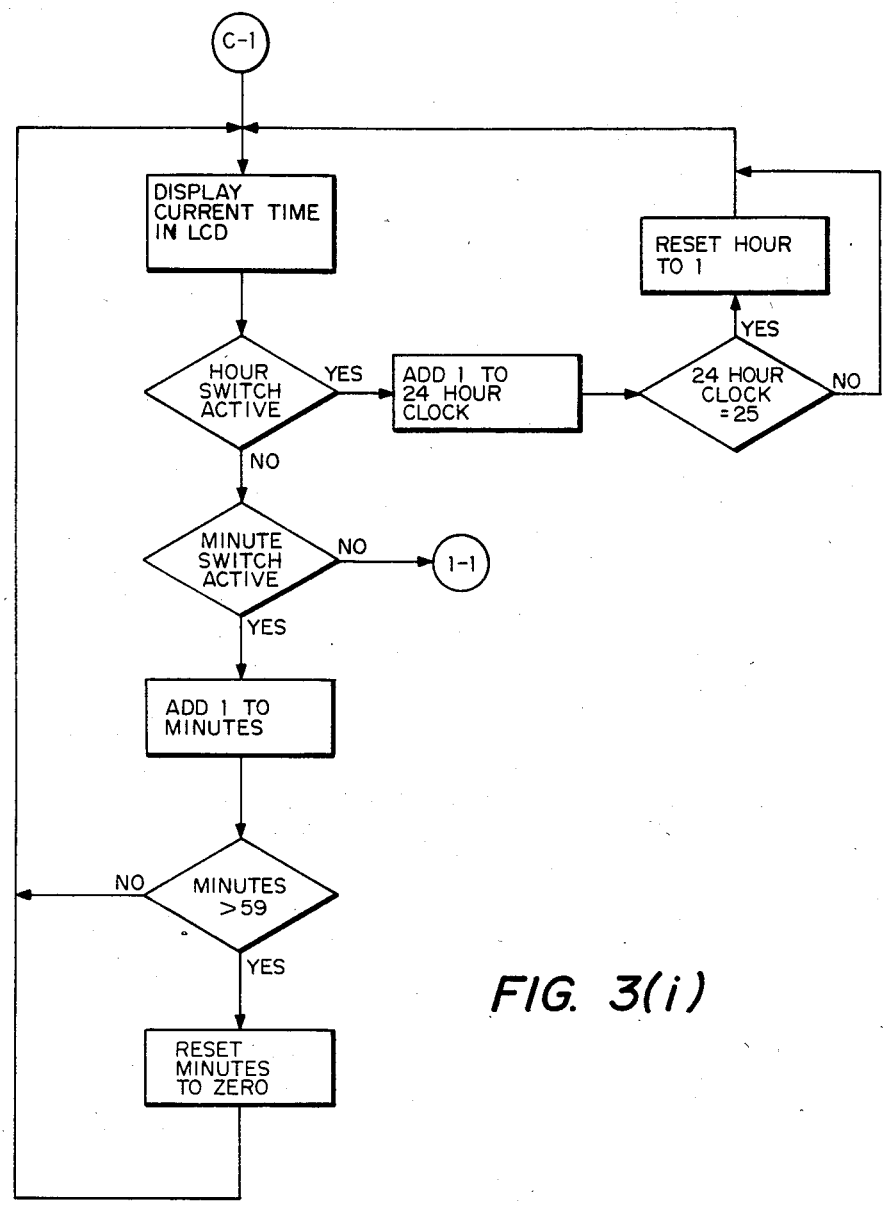
Figure 3J:
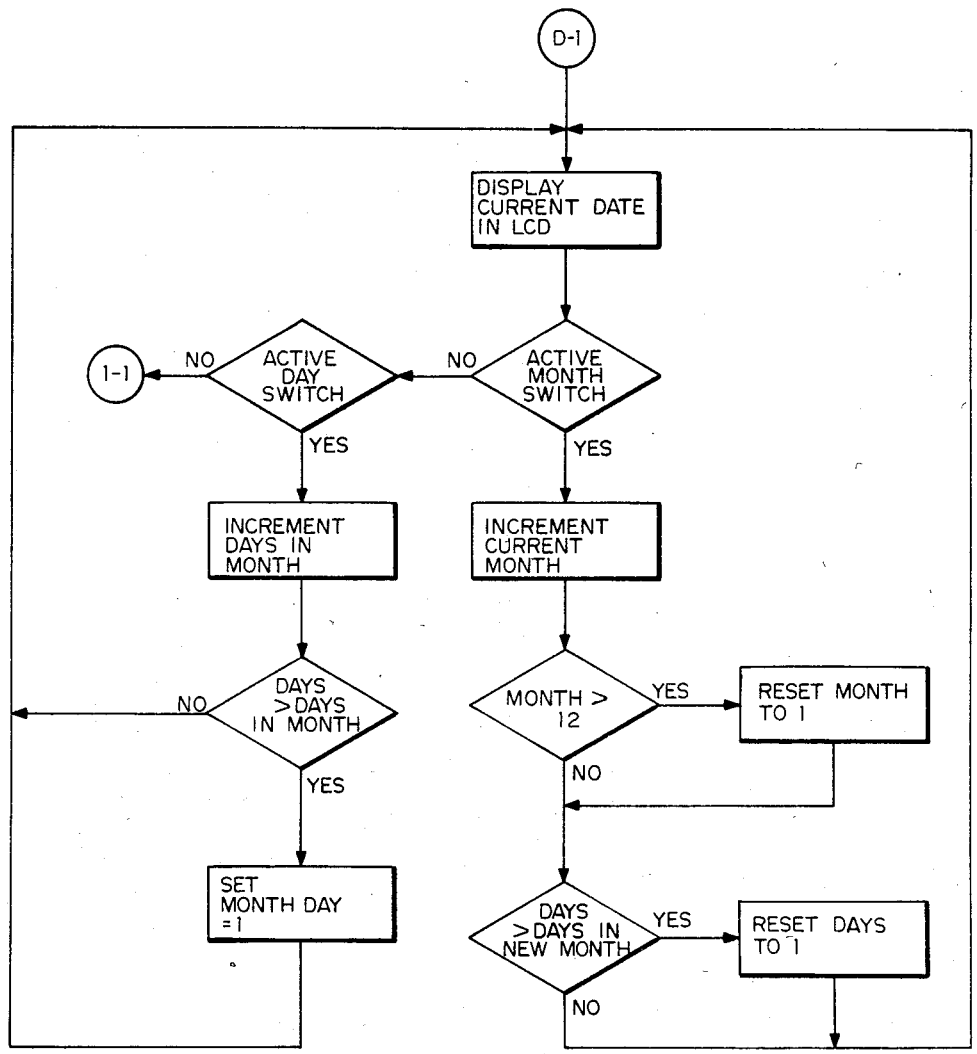
Figure 3K:
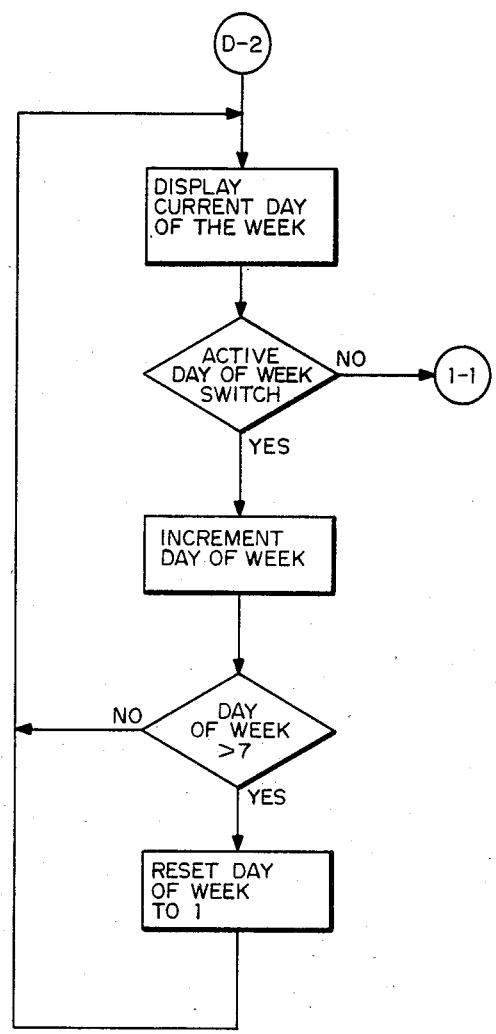
Figure 3I:
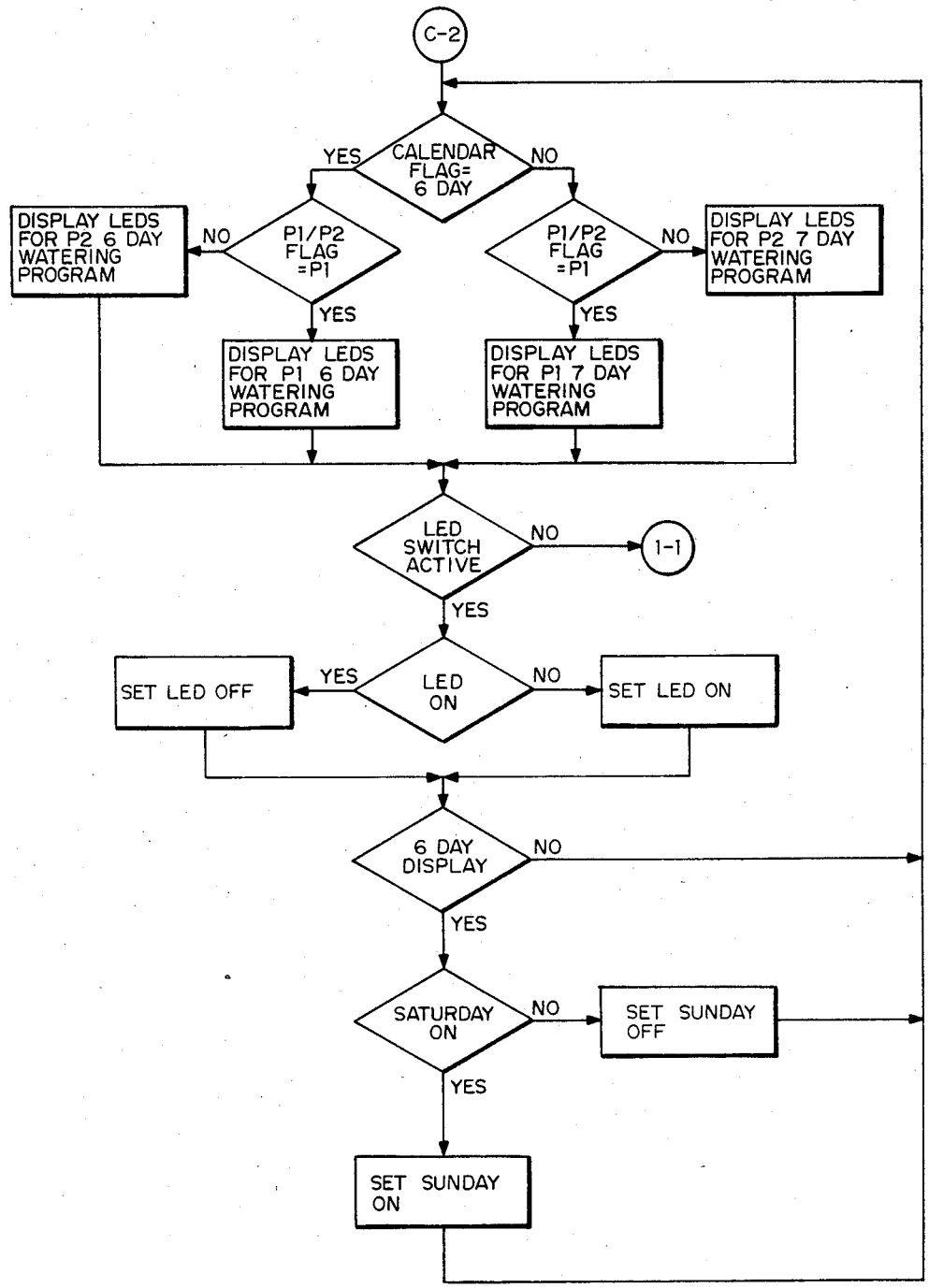
Figure 3M:
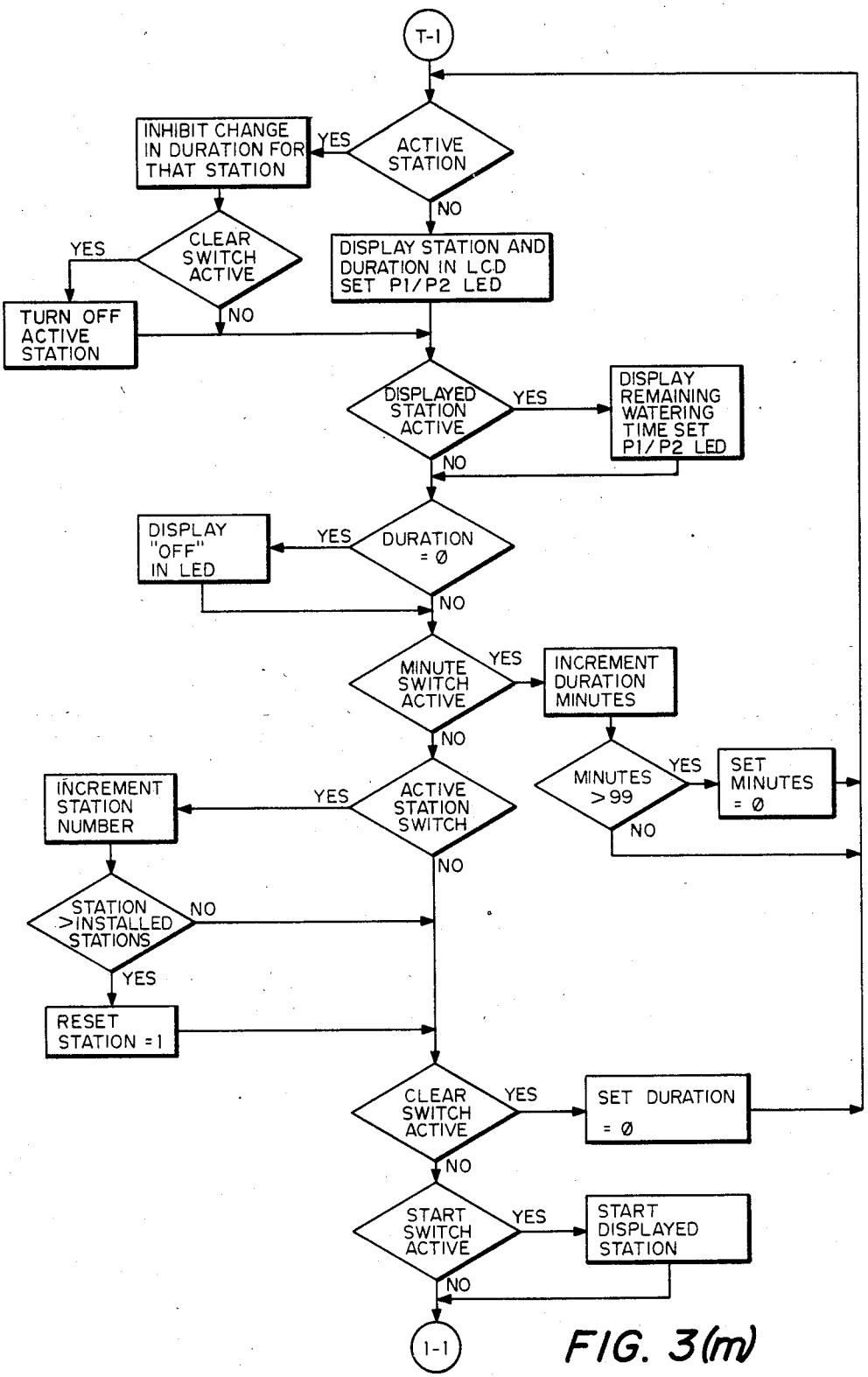

If switch 18 is in the Duration position (FIG. 3(c)) the Duration routine of FIG. 3(m) will be executed. A determination is then made as to whether switch 18 is in the Start Time A, Start Time B, Start Time C or Start Time D positions in which the logic will continue with the Start Time routine of FIG. 3(n). At the completion of the logic shown on FIG. 3(c) the logic flow returns to the 1-1 page connector on FIG. 3(a) to again determine whether a sprinker station is running in the manual mode.

It therefore can be seen that as switch 18 is rotated from position to position a new program routine is initiated and the information selected through the previous routine is automatically input to microprocessor 50. After each position routine is executed the logic flows back to the Dial routine so that the position of switch 18 can be read.

Referring now to FIGS. 3(d) and 3(e), the logic for a Timer Interrupt routine is illustrated. The Interrupt routine functions to perform all the writing to displays 14 and 42 and read the switches on panel 12 of controller 10. The conditions of the switches are stored in the RAM of microprocessor 50. Twelve determinations are made in the interrupt routine based upon the condition of the state counter with some functions being updated twice such as the refreshing of displays 14 and 42. The routine of FIGS. 3(d) and 3(e) is executed once per second. The state counter is incremented each time the Timer routine is executed.

If the state counter is 0, a determination is made whether display 14 is in the blink mode, if not, the first digit will be written into display 14. If the state counter is a 1, and display 14 is not in the blink mode, the second digit of display 14 will be written. Similarly, if the state counter is a 2 or 3, the third and fourth digits will be written into display 14. If the state counter is a 4, display 42 is readdressed and a determination is made by checking the blink flags as to whether information should be written to display 42 or whether display 42 should be flashing. After a digit is written to display 14 or display 42 is refreshed, the logic of the routine shown in FIG. 3(d) flows to the Return, FIG. 3(e), page connector I-1. The Return causes the logic to flow to the place in the program which called the Timer Interrupt routine in the clock system.

Referring to FIG. 3(e), if the state counter is a 5, all switches of panel 12 of controller 10 are read. These switches are read 360 times a second. If the state counter is a 6, 7, 8, 9 or 10, the first, second, third and fourth digits of display 14 are written and display 42 is refreshed, respectively. Page connectors T-10, T-20, T-30, T-40 and T-50 return to FIG. 3(d). If state counter is 11, all switches of panel 12 of controller 10 are read and the timer is synchronized to the AC line current.

If the state counter were equal to 5, in addition to reading all switches on panel 12, a determination is made as to whether there is a low AC line power count in the determination of whether a valve is shorted in a watering station. If such a valve is shorted, this condition will cause a drop in the line frequency count. Further, if there is a power failure, a drop in the AC line power count will also be seen. If the count drops low, an active station will be turned off and displays 14 and 42 will be placed in the blink mode. If the AC line count is not low, a determination is made as to whether controller 10 is operating from a 50 or 60 Hertz power supply. Controller 10 has the capability of operating from either of such power supplies by utilizing an external strap. The counter in the Clock routine is then set to either 60 or 50 counts per second and is incremented during each phase of the AC line current.

An additional strap of controller 10 is used for testing purposes to accelerate programming times by 60 times the normal speed. If the test strap is in use, the times are updated and the new remaining duration times are set. A synchronization to the AC line frequency is made and the logic of the Timer Interrupt routine is completed.

Referring now to FIG. 3(f), if function selector switch 18 is in the Auto position, a determination is made as to whether a sprinkler station is active. If this is the case, display 14 displays the station number and the time remaining for active watering. If no station is active, and function selector switch 18 is in the Auto position, the time of day is displayed in display 14. If function selector switch 18 is not in the Auto position, and switch 26 is active, the active program is started or advanced to the next station. A determination is then made as to whether there are additional stations to be watered after the station for which the switch 26 was activated. If there are no such stations, the water is turned off and the logic of FIG. 3(f) returns to FIG. 3(a) at page connector 1-2. If additional stations are to be watered, display 14 displays the station number and remaining time for the particular station.

If no stations are active and switch 26 has not been activated, a determination is made as to whether the calendar resynchronization strap has been set. This part of the logic automatically resynchronizes the watering cycles for the first day of each month. If the strap was set and the day was the 31st day of the month and switch 44 were in the 6 Day calendar position, no watering would take place of the last day of the month. The logic then returns to FIG. 3(a) at page connector 1-2.

A determination is then made as to whether a station is active. If the decision is yes, display 14 will display the station number and remaining time for the station. At the completion of the watering cycle, the water will be turned off and the next station will be started or the Auto routine will be completed. If there were no active stations, a determination is made as to whether the day is a watering day. If the day were not a watering day, the Auto routine is completed. If the day was a watering day, the current time is checked to determine whether the current time equals a start time. If the current time matches a start time, the watering cycle is started based upon either the P1 or P2 programming times and the logic continues back to FIG. 3(a) at page connector 1-2.

Referring now to FIGS. 3(g) and 3(h), the Minute Check routine is shown which functions to update the flags and calendar from FIG. 3(a) page connector M-1. The P1 and P2 flags are set in addition to the six or seven day calendar flag. A determination is also made as to wheather there has been a change in the minutes from the last update through the Dial routine (FIG. 3(a)). If no change has occurred in the minutes, the Minute Check routine of FIG. 3(g) returns to the Dial routine of FIG. 3(a) at page connector 1-3. If a change in minutes has occurred, a determination is made as to whether the hours need an update. A determination is then made as to whether the day of the week is to be updated.

Continuing in the Minute Check routine on FIG. 3(h), a determination is made as to whether a sufficient number of days has passed to constitute a week. If a week has passed, the week day is set to 1 and the 6 Day calendar is reset. If a week has not passed, the day of the month is incremented by 1 and a determination is made as to whether the number of counted days for the particular month is greater than the actual number of days for the particular month. If the number of actual days is less than the days in the month, the Minute Check routine returns to the Dial routine of FIG. 3(a) at the 1-3 page connector. If the count for the days of the month is greater than the real permissible day of the month such as, for example, January 32, the day of the month would be reset to 1. The number of months would be incremented by 1. A determination is then made as to whether the number of the month is greater than 12. If this determination is yes, the month is reset to 1. A determination is then made as to whether the resynchronization strap has been set and the Minute Routine returns to the Dial routine, FIG. 3(a), at page connector 1-3.

Referring now to FIG. 3(i), the Clock routine, if function selector switch 18 is in the CLOCK position as determined in the Dial routine, FIG. 3(b), page connector C-1, the current time is displayed in display 14. A determination is made as to whether switch 20 is active, and if so, one hour is added to the 24 hour clock. If the 24 hour clock exceeds 24 hours by 1 hour, the hour is reset to 1. As long as switch 20 is active, the hours will continuously be incremented. If switch 20 is not active, a determination is then made as to whether switch 22 is active, and if so, one minute is added to the display of display 14. If switch 22 is active, the minutes will be incremented until 60 minutes have been compiled at which time the minutes will be reset to 0. If neither switch 20 or 22 is active, the Clock routine returns to the Dial routine, FIG. 3(a) at the 1—1 page connector.

Referring to FIG. 3(j), the Date routine is illustrated. If function selector switch 18 is in the Date position (FIG. 3(b)), page connector D-1, display 14 displays the current date. If switch 20 is active, the month shown in display 14 will be incremented. If the number of months exceed 12, the month will be reset to 1. If the month displayed in display 14 is not greater than 12, a determination is made as to whether the number of days counted is greater than the numbers in the new month, and if a yes decision is made, the number of days is reset to 1.

If switch 20 was not active and switch 22 was active, the day of the month displayed in display 14 would be incremented. If the number of days were greater than the days in the month, the day shown in display 14 would be reset to 1. If neither switches 20 or 22 are active the Date routine is completed and the program returns to the Dial routine, FIG. 3(a) at page connector 1—1.

Referring now to FIG. 3(k), Day of week routine, if function selector switch 18 is in the Day No. position, FIG. 3(b), page connector D-2, display 14 displays the current day of the week. A determination is made as to whether switch 22 is active and if so, the day of week displayed on display 14 is incremented. If the day of week is incremented to greater than 7, the day of weak is reset to 1 and displayed on display 14. If switch 22 is not active, the day of week routine is completed and the logic returns to the Dial routine, FIG. 3(a) at page connector 1—1.

Referring now to FIG. 3(l), Calendar Routine, if function selector switch 18 is in the Calendar position, FIG. 3(b), page connector C-2, a determination is made as to whether switch 44 is in the 6 day or 7 day position. If switch 44 is in the 7 day position, display 42 will display a seven day watering program whereas if switch 44 were in the six day position, display 42 will display a six day watering program. A determination is also made as to whether switch 28 is in the P1 or P2 program position. Display 14 will indicate whether the P1 program has been selected by switch 28.

A determination is then made whether any of switches 40, 40a–40g, are active. If no switches 40 are active, the Calendar routine is completed and the logic returns to the Dial routine, FIG. 3(a) at page connector 1—1. If a switch 40 is active, a determination is made as to whether the corresponding display 42, 42a–42g is on. If the display 42 is on, it is turned off or if the display 42 is off, it is turned on. A determination is then made as to Whether switch 44 was in the 6 Day or 7 Day position. If switch 44 is in the 6 Day position, a determination is made as to the state of switch 40g, Saturday, so that switch 40a, Sunday, can be set to the same condition. In the 6 Day calender mode of operation of controller 10, the Saturday and Sunday dates are combined.

Referring now to FIG. 3(m), if function selector switch 18 is in the Duration position, FIG. 3(c), page connector T-1, the Duration routine is entered. A determination is first made whether a watering station is active, and if yes, no change in the duration for that station can be made. If switch 24 is activated, the active station will then be turned off. If there are no active stations, display 14 displays the station and duration and whether program P1 is selected. A determination is then made whether the displayed station is active. If the station displayed in display 14 is active, display 14 will indicate the remaining watering time.

A determination is then made as to whether the duration is 0 and if so, display 14 will indicate "off". A determination is then made as to whether switch 22 is activated. If switch 22 is activated, the minute display of display 14 will be incremented until display 14 reaches 99 minutes. Upon reaching 99 minutes, display 14 will then indicate a 0 minute duration.

If switch 22 were not active, a determination is made as to whether switch 20 is active for incrementing the station number. If the station number displayed in display 14 were greater than the number of stations controlled by controller 10, the station number is reset to 1. A determination is then made as to whether switch 24 is active. If the decision is yes, the duration for the particular station selected is set to 0. A determination is then made as to whether switch 26 is active. If this decision is yes, the displayed station is activated and watering begins. The activation of switch 24 places controller 10 in the manual made of operation such that the displayed station is activated and the remaining watering time will be displayed in display 14. At the completion of the Duration routine, the logic returns to the Dial routine, FIG. 3(a) at the 1—1 page connector.

Figure 3N:
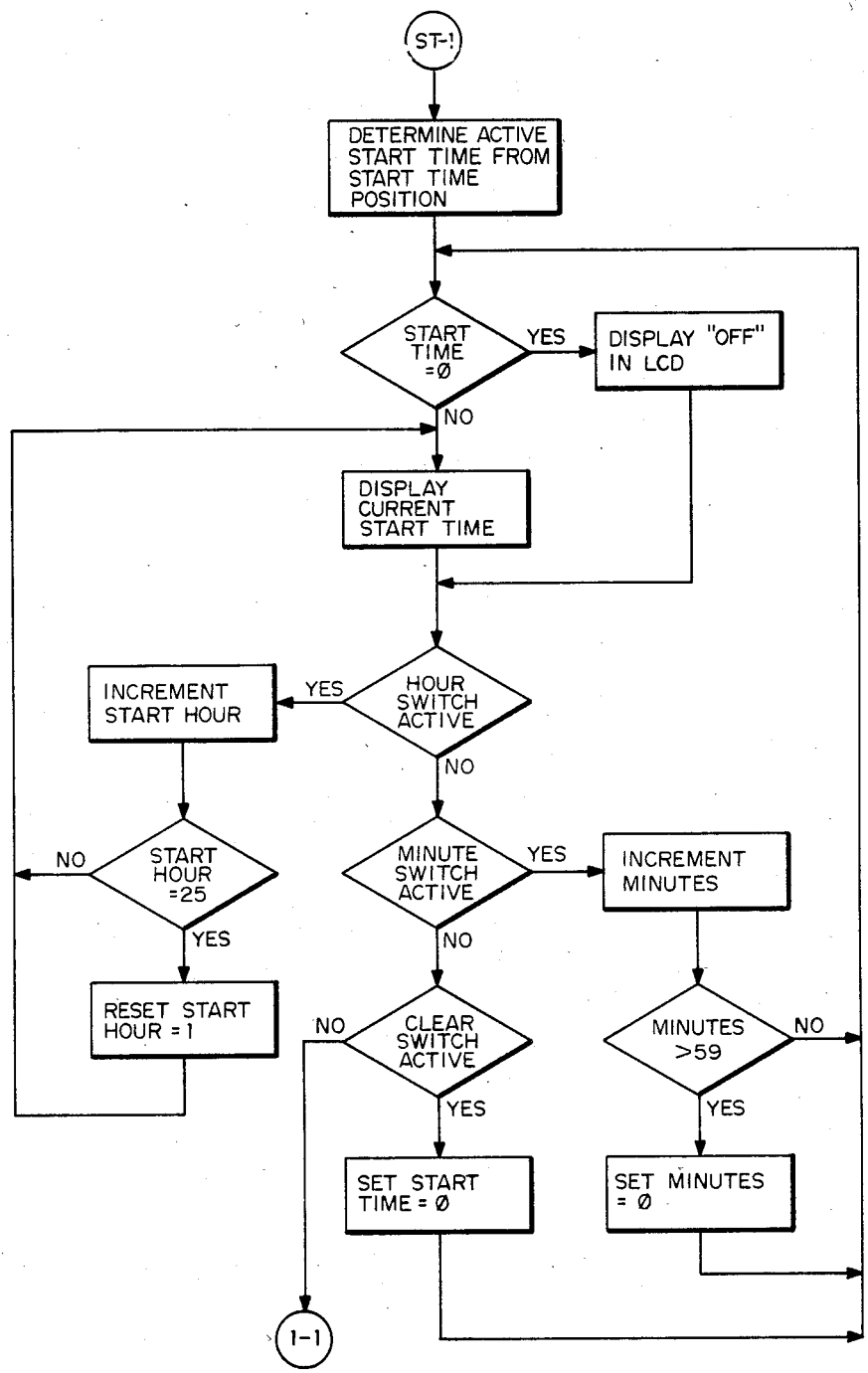

Referring now to FIG. 3(n), with function selector switch 18 in the Start Time position A, B, C or D, FIG. 3(c) page connector ST-1 the Start Time routine is initiated. A determination is made as to the start time position since there is a possibility of eight start times, four start times for each of program 1 and program 2. The addresses for each of the eight starting times are determined. A determination is then made as to whether the start time is 0. If yes, display 14 displays "off".

If the start time were not 0, display 14 displays the current start time. A determination is then made as to whether switch 20 was active. If switch 20 were active, display 14 will be incremented until the hours have been incremented to 25. At that point, display 14 will display a 1. If switch 20 were not active, a determination is made as to whether switch 22 is active for incrementation of the minutes for the start time selected by switch 18. If switch 22 were active, the minutes would be incremented in display 14 until 60 minutes have been reached at which point a minute display of display 14 will indicate 0 minutes. If neither switch 20 or switch 22 were active, a determination is made as to whether switch 24 is active. If active, the start time is set to 0 and "off" is displayed in display 14. If switch 24 is not active, the Start Time routine is complete and the logic returns to the Dial routine, FIG. 3(a at the 1—1 page connector.

It therefore can be seen that the present controller provides for a simplified solid state controller having a simplified data entry system for use in an irrigation system. The present invention further provides for the monitoring of faulty valves of the sprinkler stations to automatically skip such faulty stations.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. An automatic irrigation sprinkler controller for controlling a plurality of sprinkler stations comprising:
   a microprocessor including means for storing irrigation information and means for generating control signals to actuate the plurality of sprinkler stations;
   a function selector switch rotatable to a plurality of positions to enable an operator to select one of a plurality of functions and to simultaneously input selected irrigation information associated with the selected function into said microprocessor upon rotation to another one of the plurality of positions;
   a plurality of switch means for allowing the operator to select irrigation information from a menu provided by said microprocessor depending upon the function selected by said function selector switch; and
   display means for displaying the irrigation information selected by said plurality of switch means depending upon the function selected by said function selector switch.

2. An automatic irrigation sprinkler controller for controlling a plurality of sprinkler stations comprising:
   processor means for storing irrigation information and for generating control signals applied to the plurality of sprinkler stations for actuating the sprinkler stations based upon said stored irrigation information;
   function selector switch means rotatable between a plurality of switch positions for allowing an operator to select a function and automatically input selected irrigation information associated with the selected function into said processor means as said function selector switch means is rotated from one switch position to a subsequent switch position;

first information switch means for allowing the operator to select hour, month and sprinkler station number irrigation information from a menu provided by said processor means;

second information switch means for allowing the operator to select minute, day and day number irrigation information from a menu provided by said processor means;

said first and second information switch means being selectively enabled by the position of said function selector switch means; and display means for displaying irrigation information selected by the operator through actuation of said first and second information switch means.

3. The controller of claim 2, further comprising:

weekly calendar switch means for selecting an irrigation cycle based upon days of the week; and means for indicating to the operator which days of the week have been selected for the irrigation cycle.

4. The controller of claim 3, further comprising:

calendar switch means for selecting an irrigation cycle based upon a six day or a seven day cycle.

5. The controller of claim 2, further comprising a power source for operating a valve at each of the plurality of sprinkler stations for generating a source voltage;

means for generating a reference voltage level;

means for comparing the source voltage of the valve of each of the plurality of sprinkler stations with said reference voltage level; and means connected to said comparing means for preventing actuation of a sprinkler station having a defective valve indicated by said comparing means when the source voltage is less than said reference voltage level.

* * * * *

UNITED STATES PATENT AND TRADEMARK OFFICE
CERTIFICATE OF CORRECTION

PATENT NO. : 4,569,020

DATED : February 4, 1986

INVENTOR(S) : Max E. Snoddy, Charles S. Putnam, Robert S. Gammenthaler, William P. Lutts, and Leo L. Brewster It is certified that error appears in the above-identified patent and that said Letters Patent is hereby corrected as shown below:

Column 13, line 1, delete "weak" and insert --week--.
Column 13, line 25, delete "Whether" and insert --whether--.
Column 13, line 61, delete "made" and insert --mode--.
Column 14, line 23, delete "3(aat" and insert --3(a) at--.
Column 16, line 7, after "comprising" insert --:--.

Signed and Sealed this

Third Day of June 1986

[SEAL]

Attest:

DONALD J. QUIGG

Attesting Officer

Commissioner of Patents and Trademarks